United States Patent [19]

Chisholm

[11] 4,398,628

[45] Aug. 16, 1983

[54] METHODS OF INSERTING PINS INTO AN APPARATUS AND A PIN SUPPORTING SHUTTLE USED THEREFOR

[75] Inventor: William M. Chisholm, Midlothian, Va.

[73] Assignee: Western Electric Company, Inc., New York, N.Y.

[21] Appl. No.: 326,103

[22] Filed: Nov. 30, 1981

Related U.S. Application Data

[63] Continuation-in-part of Ser. No. 192,271, Sep. 30, 1980, abandoned.

[51] Int. Cl.³ .............................................. B65G 47/00

[52] U.S. Cl. .................................. 198/339; 198/486; 198/653; 294/102 R; 29/845

[58] Field of Search ................. 29/712, 711, 714, 718, 29/759, 760, 837, 845; 140/147, 149; 206/329, 344, 347, 820; 339/74 R, 220 R; 294/102 R; 198/339, 486, 653, 646

[56] References Cited

U.S. PATENT DOCUMENTS

| | | |
|---|---|---|
| 3,545,606 | 12/1970 | Bennett et al. . |
| 3,800,416 | 4/1974 | Shultz, Jr. et al. . |
| 3,841,472 | 10/1974 | Fuller et al. . |
| 3,875,636 | 4/1975 | Shultz, Jr. et al. . |
| 4,033,456 | 7/1977 | Wion et al. . |
| 4,203,698 | 5/1980 | Dupuis . |
| 4,365,398 | 12/1982 | Chisholm . |

*Primary Examiner*—Gene Crosby
*Assistant Examiner*—Carl J. Arbes
*Attorney, Agent, or Firm*—J. B. Hoofnagle; H. St. Julian

[57] ABSTRACT

A plurality of pins (20) are supported and held within a pin supporting shuttle (54) by wedging the shank portion (24) of each of the pins between a respective one of a plurality of spaced parallel channels (58) and a ramp (62). The shuttle (54) is then moved to place a free end of each of the pins (20) in a gripped position within an insertion apparatus (55). The shuttle (54) is manipulated so that the shank portion (24) is allowed to return to a normal axis of each respective pin (20). The shuttle (54) is then removed from about the pins (20).

29 Claims, 27 Drawing Figures

Fig. 10
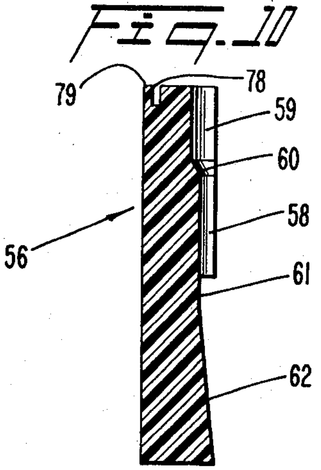
Fig. 14
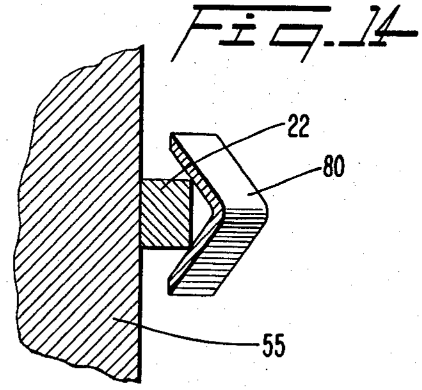
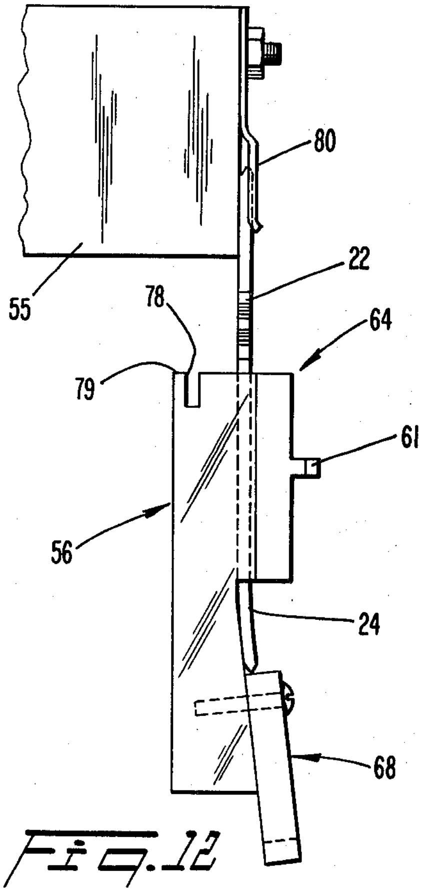
Fig. 12
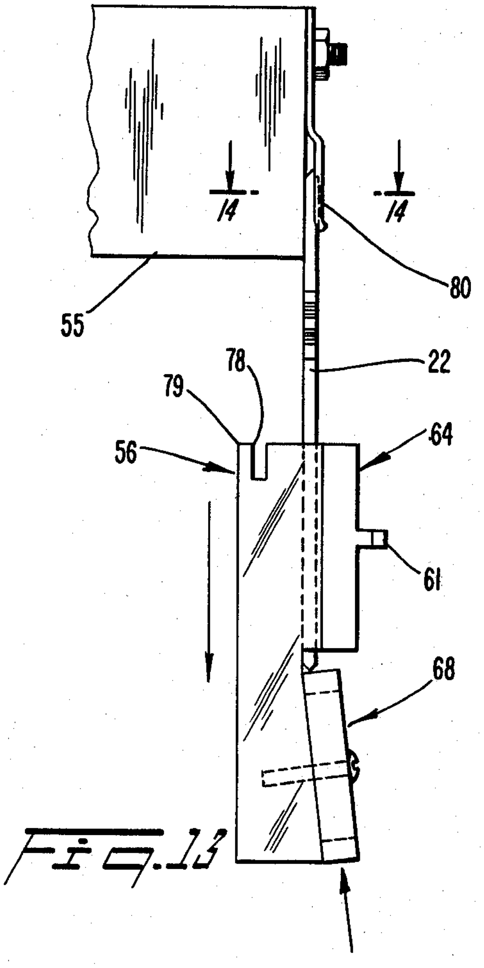
Fig. 13

Fig. 11
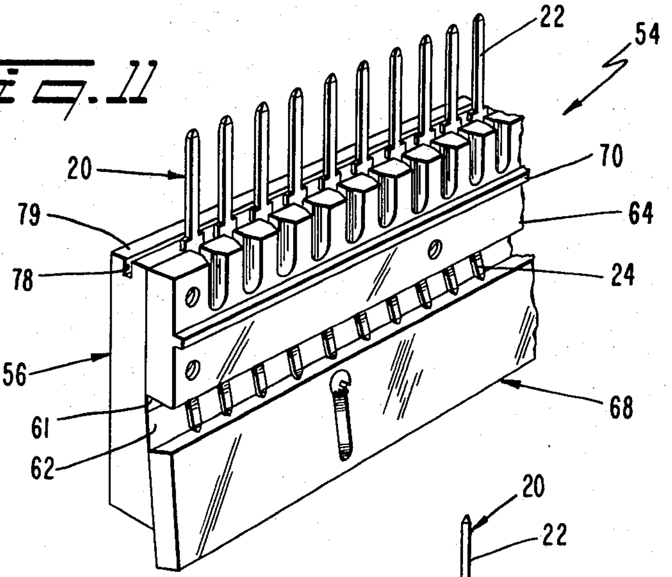
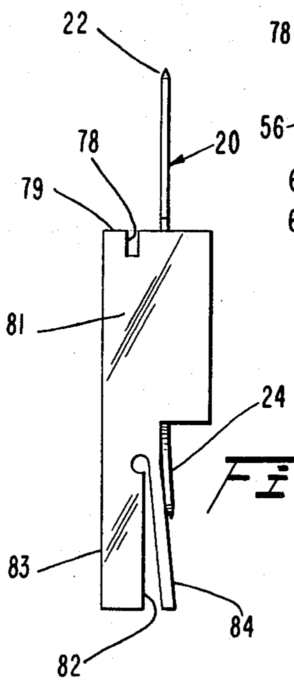
Fig. 15
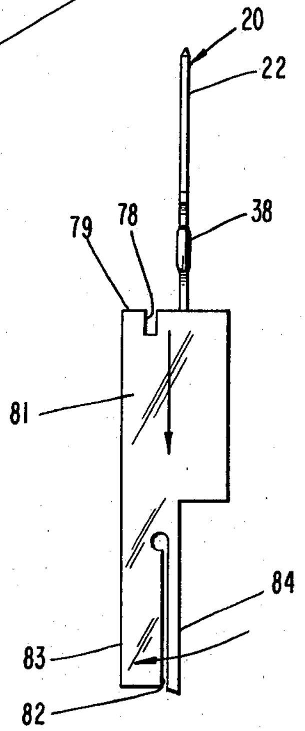
Fig. 16
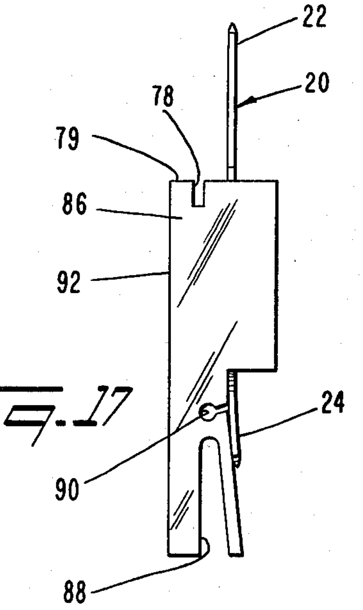
Fig. 17

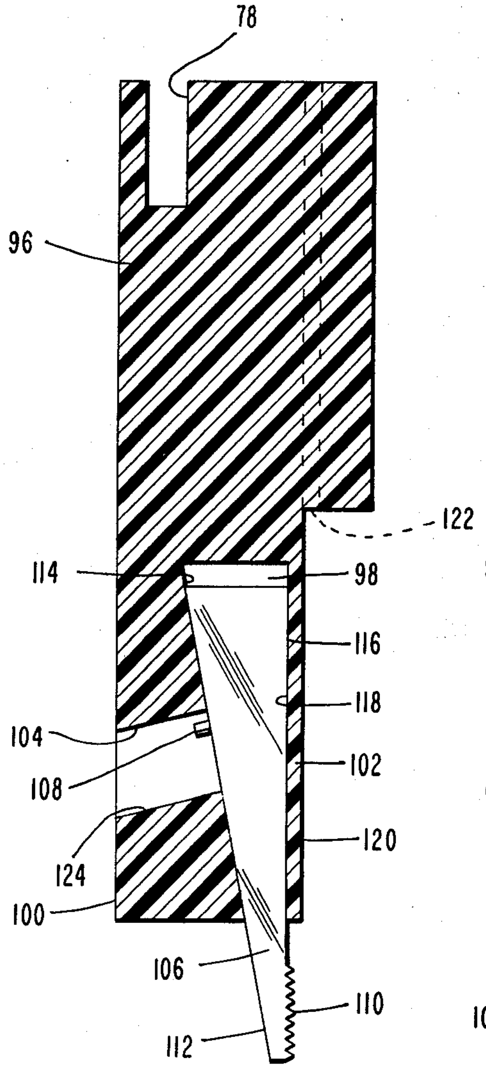
Fig. 18
Fig. 19
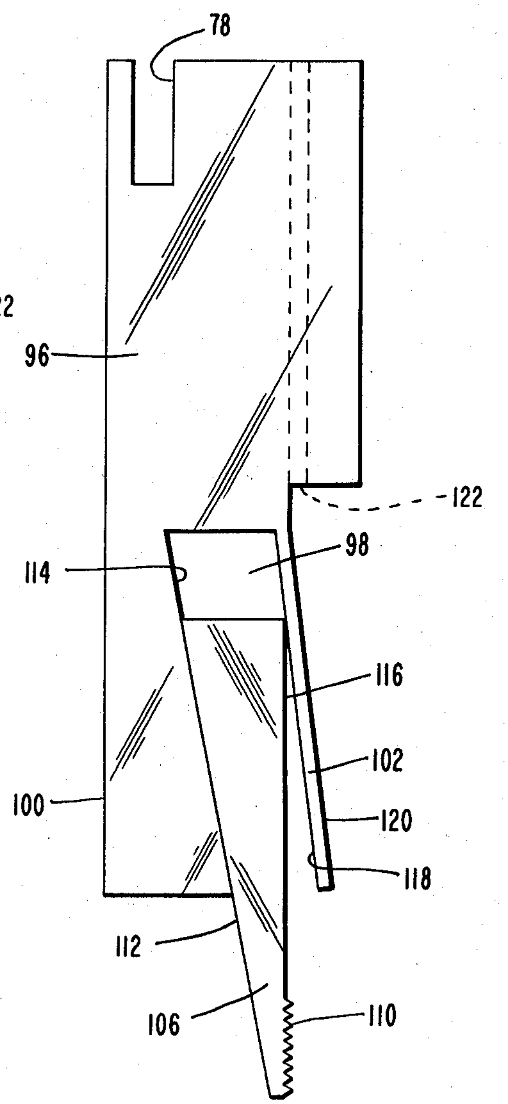

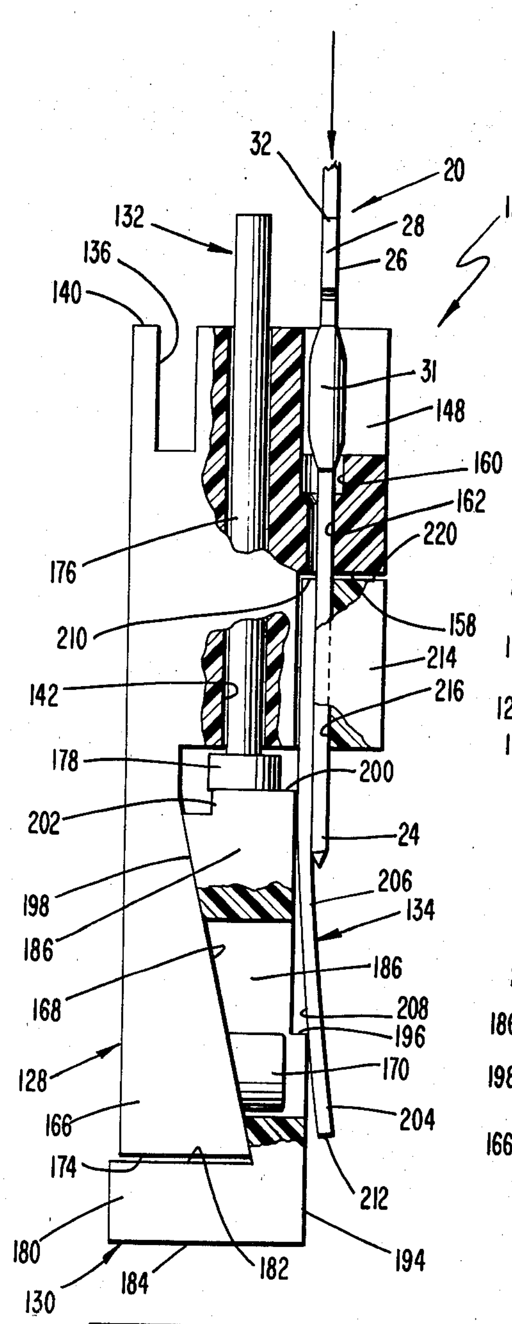
Fig. 23
Fig. 24
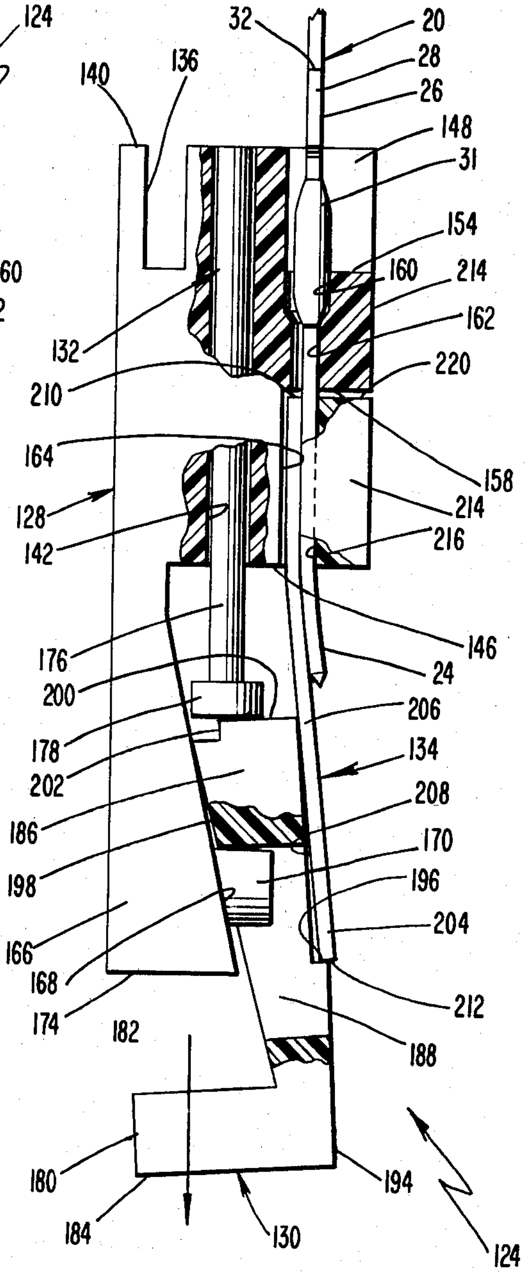

METHODS OF INSERTING PINS INTO AN APPARATUS AND A PIN SUPPORTING SHUTTLE USED THEREFOR

CROSS-REFERENCE TO RELATED APPLICATION

This application is a continuation-in-part of copending application Ser. No. 192,271 filed Sept. 30, 1980 and now abandoned.

TECHNICAL FIELD

This invention relates to methods of inserting pins into an apparatus and to a pin supporting shuttle used therefor and particularly to methods of inserting pins into an apparatus and a pin supporting shuttle which facilitates the transportation and handling of end-carried and body-carried pins prior to and during the insertion of the pins into the apparatus.

BACKGROUND OF THE INVENTION

In the manufacture of some types of rigid pin-populated printed wiring boards, terminal pins are inserted into apertures in the board and electrically engage portions of printing wiring on the boards to provide for connections to electrical circuits. Typically, the spacing between adjacent apertures is extremely small. For example, the spacing between apertures on one board is 0.125 inch. Moreover, each terminal pin typically has a square cross section of, for example, 0.025 inch except in those areas where the pin is formed with lateral ears having a push shoulder and an aperture-engaging portion intermediate the ends thereof.

Due to the close spacing between apertures and the small size of the pin, it is most difficult and tedious to assemble the pins on an individual basis. Additionally, the relatively small size of the pins necessitates delicate handling prior to and during insertion of the pins into the apertures. However, where each board may contain thousands of closely-spaced apertures, efficiency and economy dictate that the pins be prealigned and gang-inserted into the board apertures.

In the past, many techniques have been developed to facilitate the handling of the pins prior to insertion into the board apertures. For example, in one technique, the pins are stamped in a linked configuration having an integrally formed edge-strip carrier. The pins are then fed into an insertion machine in the linked configuration and are separated individually from the carrier. Each of the separated pins is fed individually and independently of the other separated pins through feed chutes and assembled with a supporting structure. In another example, the linked pins are fed to an insertion machine and are separated serially from the carrier. Thereafter, each pin is inserted into the board immediately after being separated from the carrier.

In another technique, pins are formed from sheet stock in a parallel array with opposite ends of the terminal pins interconnected by opposed parallel side rails to form a terminal strip. In an assembling operation, one of the side rails is separated from insertion ends of the pins and the other side rail may be used as a pusher member to insert the separated ends into apertures in a printed wiring board. After the assembling operation, the remaining side rail is separated from the opposite ends of the terminal pins. In an alternate technique, one of the side rails is removed and the pins are assembled with an insertion apparatus. After the assembly with the apparatus, the other side rail is removed from the pins. The insertion of the pins into the board is then accomplished utilizing push shoulders formed on intermediate portions of the pins.

In still another technique, a terminal pin strip includes terminal pins which are interconnected adjacent respective ones of their ends by a removable side rail. Adjacent terminal pins are further interconnected intermediate their ends by a strip member which may be utilized to provide an electrical connection between two or more adjacent terminal pins after the pins have been assembled with a supporting structure. When adjacent terminals are not to be electrically interconnected, the linking strip member must also be severed which is independent of the pins being carried therewith.

U.S. Pat. No. 3,841,472 which issued to R. Fuller et al., discloses a pin or terminal carrier strip. The carrier strip includes bendable sheet material which is folded to form a "U" or channel shape having a center portion and two opposed side portions. The center portion of the channel has a plurality of evenly spaced indexing holes. Each side portion is formed with a plurality of carrier slots each of which contains a flared portion whose taper opens toward an edge of the strip. Each slot also includes a neck portion adjacent the flared portion and a widened contact holding portion. The neck portion releasably retains the pin within the holding portion. Each carrier slot formed along one side portion of the strip is aligned with a carrier slot formed along the opposite side portion of the strip. Each pin is inserted into a pair of spaced, opposed carrier slots by automatic means such as a vibratory hopper. The structure of the carrier does not facilitate the release of the pins therefrom without utilizing other external means. Moreover, the carrier's structure could permit undesirable axial movement of the pins mounted therein during handling. This could result in an uneven and misaligned array of pins.

Consequently, there is a need for a device which maintains an even and aligned array of pins during handling and transportation thereof.

SUMMARY OF THE INVENTION

This invention contemplates methods of inserting pins into an apparatus and a pin supporting shuttle used therefor where each pin has a shank portion and a tip. An intermediate section of the shank portions of each of the pins is enclosed within the pin supporting shuttle. The tip of each of the shank portions is located laterally of the normal axis of the pin to wedge the shank portions within the shuttle. The shuttle is then moved to insert opposite ends of the pins into gripping portions of the apparatus. Thereafter, the tip of each of the pins are returned to alignment with the normal axis of the pin and whereby permit separation of the pins from the shuttle.

The pin supporting shuttle which supports strip-carried pins includes means for enclosing the intermediate section of each of the pins while maintaining a uniform spacing therebetween and means for locating the tip of each of the shank portions laterally of the normal axis of the pin to wedge the shank portion between the enclosing means and the locating means. The shuttle further includes means for returning the tip of each of the pins to alignment with the normal axis of the pin to permit separation of the pins from the shuttle.

BRIEF DESCRIPTION OF THE DRAWINGS

FIG. 10 is a sectional view showing the back member of FIG. 5;

FIG. 11 is a perspective view showing the pin supporting shuttle of FIG. 4 supporting a plurality of pins of FIG. 1 therein;

FIG. 12 is a side view showing the insertion of pins into gripping portions of an apparatus utilizing the pin supporting shuttle of FIG. 4;

FIG. 13 is a side view showing the separation of the pin from the shuttle of FIG. 4;

FIG. 14 is a sectional view showing a pin being gripped by the gripping portion of FIGS. 12 and 13;

FIG. 15 is a side view showing another embodiment of a shuttle embodying certain principles of the invention;

FIG. 16 is a side view showing the separation of the pin from the shuttle of FIG. 15;

FIG. 17 is a side view showing another embodiment of a shuttle embodying certain principles of the invention;

FIGS. 18 and 19 are side views showing another embodiment of a shuttle embodying certain principles of the invention;

FIGS. 22 through 25 are side views of the pin-supporting shuttle of FIG. 20; and FIGS. 26 and 27 are side views showing use of the pin-supporting shuttle of FIG. 20 to assemble shuttle-supported pins into a pin-insertion head.

DETAILED DESCRIPTION

Figure 1:
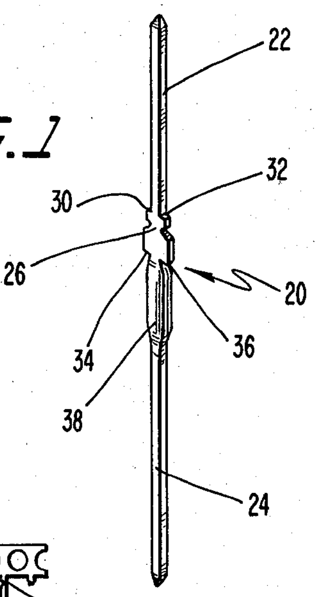
FIG. 1 is a perspective view showing a terminal pin.

Referring to FIG. 1, there is illustrated a terminal pin, designated generally by the numeral 20. The terminal pin 20 is formed from blank stock (not shown) to include axially aligned shank portions 22 and 24 at opposite ends thereof. The end of the shank portion 24 is to be inserted into one of a plurality of apertures (not shown) of a printed wiring board (not shown) while the end of the shank portion 22 extends from the board for receiving a connector housing (not shown). Lateral ears 26 and 28 are formed intermediate the ends of the pin 20 adjacent the shank portion 22 and include shoulder or push surfaces 30 and 32, respectively, closest to the shank portion 22 and undersurfaces 34 and 36, respectively, closest to the shank portion 24. The pin 20 is also formed with a board-engaging, pin-retaining portion 38 which is eventually located within one of the apertures of the printed wiring board and is designed to facilitate retention of the pin with the board but also permit the pin to be removed from the aperture.

Figure 2:
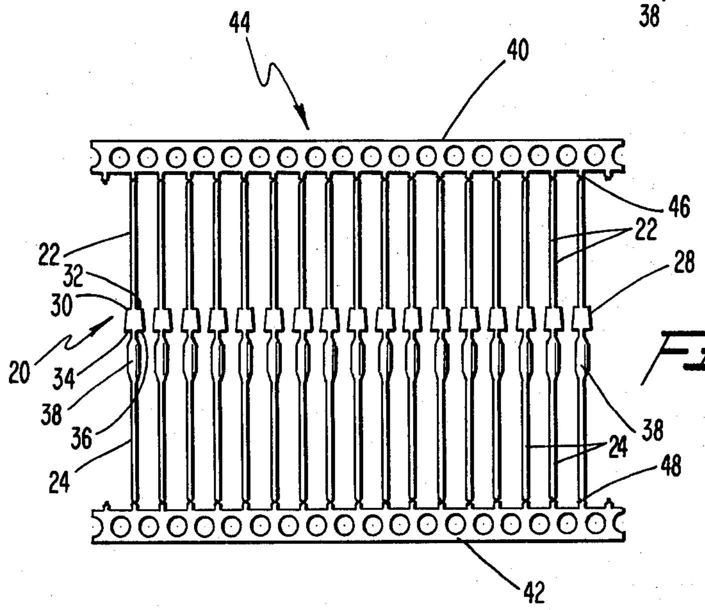
FIG. 2 is a front view showing a plurality of pins of FIG. 1 held in a uniform spacing by end-carrier strips.

Referring to FIG. 2, there is illustrated a plurality of terminal pins 20 which have been formed in a predetermined uniform spacing from blank stock (not shown) during a punching and stamping operation. The pins 20 are held in the uniform spacing by integrally attached end-carrier strips 40 and 42 also formed from the blank stock in the same punching and stamping operation. The pins 20 and end-carrier strips 40 and 42 form a multiple pin assembly designated generally by the numeral 44. The ends of the shank portions 22 and 24 of the pins 20 which are linked integrally with the end-carrier strips 40 and 42, respectively, are scored at points 46 and 48, respectively, to facilitate subsequent easy removal of the strips from integral attachment with the pins.

Figure 3:
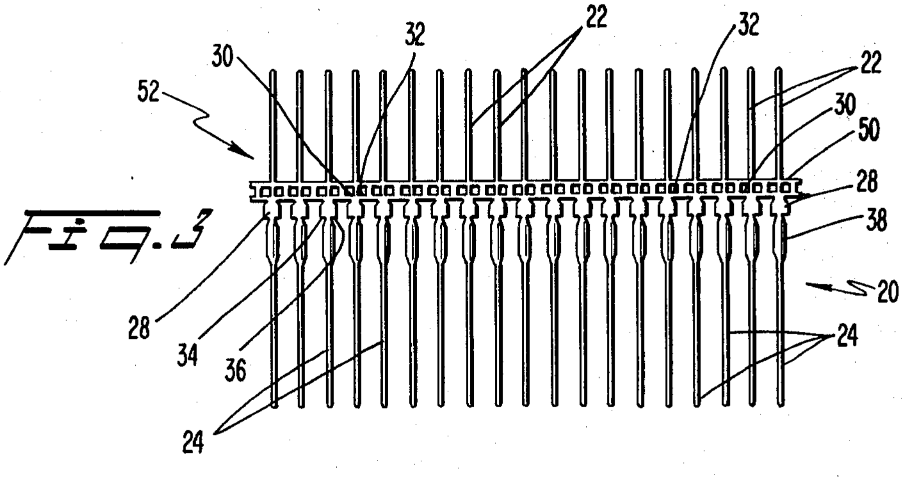
FIG. 3 is a front view showing a plurality of pins of FIG. 1 held in a uniform spacing by body-carrier strips.

Referring to FIG. 3, there is illustrated a plurality of terminal pins 20 which have been formed in a predetermined uniform spacing from blank stock (not shown) during a punching and stamping operation. The pins 20 are held in the uniform spacing by integrally formed, intermediate or body-carrier webs or strips 50 also formed from the blank stock in the same punching and stamping operation. The pins 20 and the web 50 form a body-carried pin assembly designated generally by the numeral 52. The pins 20 of the assembly 52 also include shank portions 22 and 24, lateral ears 26 and 28, shoulder or push surfaces 30 and 32, undersurfaces 34 and 36 and pin-retaining portion 38. Upper portions of the lateral ears 26 and 28 are linked integrally with the strips 50. The strips 50 could be scored to facilitate easy removal thereof whereby the mechanical stability of the pins 20 is enhanced.

Figure 4:
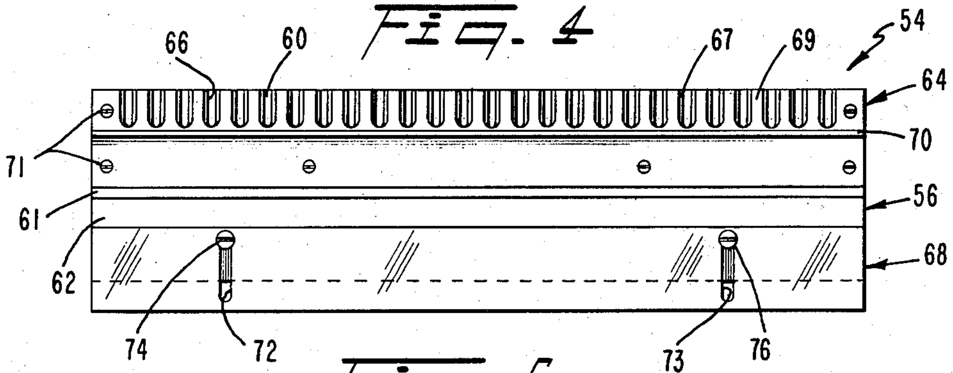
FIG. 4 is a front view showing a pin supporting shuttle embodying certain principles of the invention.

Referring to FIG. 4, there is illustrated a pin supporting shuttle, designated generally by the numeral 54. The shuttle 54 facilitates retention of the pins 20 in the uniform spacing during and after the removal of the end-carrier strip 40 or the strips 50. The shuttle 54 also facilitates the assembly of the pins 20, while maintaining the uniform spacing, into an apparatus 55 (FIGS. 12 and 13). The apparatus 55 later facilitates the insertion of the pins 20 into apertures of the printed wiring board.

Figure 5:
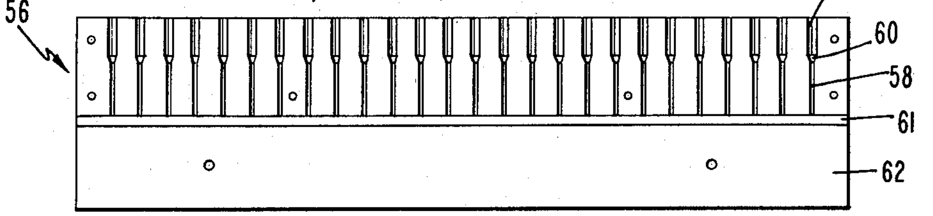
FIG. 5 is a front view showing a back member of the pin supporting shuttle of FIG. 4.
Figure 8:
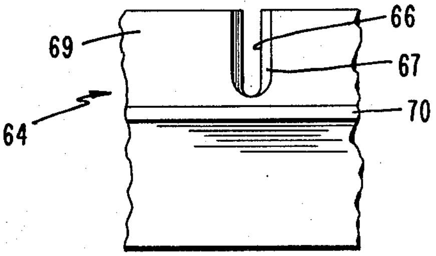

Referring to FIG. 5, the shuttle 54 includes a back member designated generally by the numeral 56. The back member 56 includes a plurality of parallel, square channels 58 formed in a front face of the member and having a dimension which is slightly larger than the square cross section of the shank 24 of the pins 20. The channels 58 are formed by a base and two spaced, opposed side walls and are spaced from each other with the uniform spacing of the pins 20 formed with the multiple end-carried pin assembly 44 and the body-carried pin assembly 52. Each channel 58 communicates with an enlarged and rounded portion 59 formed in the front face of member 56 adjacent one edge of the member at a pin-entry end of the channel. The base of each portion 59 is recessed from the base of the adjacent channel 58 with a ramp 60 (FIG. 10) formed therebetween. The rounded portion 59 facilitates aligned entry of shank portion 24 into the channels 58. The back member 56 also includes an intermediate surface 61 formed on the front face thereof adjacent to a pin-exit end of the channels 58 and which is in the plane of the base of the channels. A ramp 62, which is also illustrated in FIG. 8, is formed on the front face of the member 56 and extends from an edge of the intermediate surface 61 to an edge of the back member opposite the one edge of the member.

Figure 6:
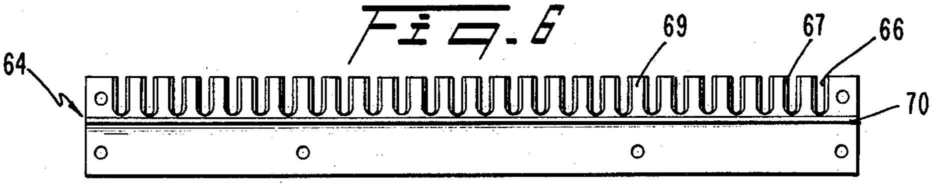
FIG. 6 is a front view showing a front member of the pin supporting shuttle of FIG. 4.
Figure 7:
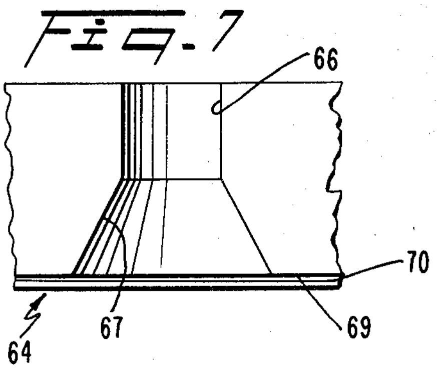
FIGS. 7 and 8 are partial views showing one of the slots formed in the front member of FIG. 6.

Referring to FIG. 6, there is illustrated a front member designated generally by the numeral 64. The front member 64 includes a plurality of slots 66 formed along one edge thereof. The slots 66 have the same uniform spacing as the channels 58 of the back member 56. Referring to FIGS. 7 and 8, each of the slots 66 is flared having a taper 67 which opens toward one side 69 of the front member 64. When the front member 64 is assembled with the back member 56, the slots 66 are aligned with the rounded portions 59 of the channels 58. The flared slots 66 facilitate the entry of the shank portions 24 of the pins 20 laterally into the portions 59. Moreover, the front member 64, when assembled with the back member 56, facilitates the enclosure of the channels 58. The front member 64 further includes a rib 70 formed on the one side 69 to facilitate subsequent removal of pins 20 from the shuttle 54. As illustrated in FIG. 4, the front member 64 is attached to the back member 56 by conventional means, such as screws 71. Although the back member 56 and the front member 64 are separate members, both members could be molded as one member.

Figure 9:
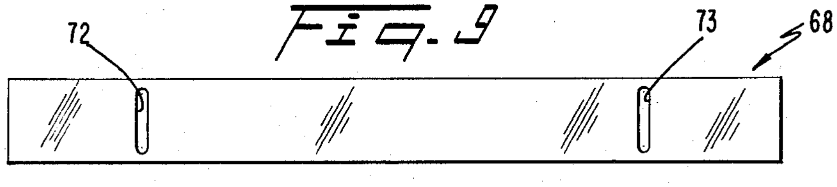
FIG. 9 is a front view showing the pin release bar of the pin supporting shuttle of FIG. 4.

Referring to FIG. 9, there is illustrated a pin release bar designated generally by the numeral 68. The pin release bar 68 contains two parallel, spaced slots 72 and 73 formed therethrough. As illustrated in FIG. 4, the pin release bar 68 is attached to back member 56 by shoulder screws 74 and 76 which are positioned within the slots 72 and 73, respectively. When the bar 68 is assembled with the back member 56, the slots 72 and 73 and the screws 74 and 76 facilitate limited movement of the bar along the ramp 62.

Referring to FIG. 10, there is illustrated a sectional view of the bar member 56. A slot 78 is formed within one edge 79 of the back member 56 and extends between opposite sides thereof. The slot 78 is 0.125 inch deep and 0.050 inch wide. The slot 78 facilitates the removal of end-carrier strip 42.

To use the pin supporting shuttle 54 with the multiple pin assembly 44 (FIG. 2), end carrier strip 42 is located within slot 78. The remaining portion of the multiple pin assembly 44 is then pivoted relative to the slot 78 whereby the end-carrier strip 42 is separated from the shank portions 24 along the scored points 48 leaving the pins 20 held only by the end-carrier strip 40. The tips of the shank portions 24 are then combed laterally through the flared slots 66 and into the rounded portions 59. Force is then exerted on the end-carrier strip 40 so that the tips of shank portions 24 are moved over ramp 60 and enter into the pin-entry end of the channels 58. As the tips of the shank portions 24 are moved through and exit at the pin exit end of the enclosed channels 58, the tips pass over intermediate surface 61 before engaging ramp 62 to provide extended axial freedom for the tips before moving onto the ramp. This, coupled with the oversize channels 58, permits flexing of the pin shank portions 24 between the channels and the ramp 62 without permanently bending the shank portions as the tips eventually move onto the ramp. Thus, as the tips of the shank portions 24 are moved onto the ramp 62, the tips are located laterally of the normal axis of the pins 20. Movement of the shank portions 24 is continued until tips of the shank portions come to rest against the pin release bar 68 as illustrated in FIG. 12. The pins 20 are now wedged and held with the shuttle 54 by virtue of the flexing of the pins laterally between the enclosed channels 58 and the ramp 62 with shank portions 22 and end-carrier strip 40 extending outwardly from the shuttle. Once the pins 20 are captured and held within the shuttle 54, end-carrier strip 40 can be flexed and removed with the uniform spacing between the pins being maintained by the shuttle. Referring to FIG. 11, there is illustrated a plurality of pins 20 supported by the shuttle 54 having the strips 40 and 42 or 50 removed.

Referring to FIGS. 12 and 13, the pins 20 contained within the shuttle 54 can be inserted into the apparatus 55. The apparatus 55 includes a plurality of spring-biased, V-shaped fingers 80 (FIGS. 12, 13 and 14) which capture and grip the shank portions 24 of the pin. The fingers 80 retain the pins 20 with the apparatus 55 during the removal of the pins 20 from the shuttle 54. The shuttle 54 is moved to place the shank portions 22 in a gripped position with the fingers 80 of the apparatus 55. To remove the pins 20 from the shuttle 54, an operator of the shuttle places his thumbs on the rib 70 and his fingers beneath the pin release bar 68. The thumbs are moved in the direction of the fingers to move the back member 56 in the direction thereof while the bar 68 remains stationary. This movement creates a relative movement between the back member 56 and the bar 68 whereby the bar moves relatively over the surface of the ramp 62. Moreover, during this relative movement, constant pressure of the operator's fingers against the bar 68 urges the pins 20 toward the gripping portions 80 while the back member 56 moves over the shank portions 24. This insures that the pins 20 remain assembled with apparatus 55 during the period when the shuttle 54 is being withdrawn from the position about the pins. Further, the movement facilitates the release of the tips of the shank portions 24 form the ramp 62 to return each tip to alignment with the normal axis of the respective pin 20 and thereby permit separation of the pins from the shuttle 54. When the shank portions 24 have been released from the ramp 62, the shuttle 54 is moved in a direction away from the apparatus 55 but along the plane of the pins 20 to release the shank portions 24 from the channels 58.

The pin collecting shuttle 54 also can be utilized with the body-carried assembly 52 (FIG. 3). Since there are no end-carrier strips, the shank portions 24 are combed laterally through the flared slots 66 and come to rest within the rounded portions 60. The shank portions 24 are then moved through the enclosed channels 58 and engage and become frictionally held by the ramp 62. The shuttle 54 is then moved to an apparatus (not shown) which removes the strips 50 which interconnect the pins 20. Thereafter, the shuttle 54 is moved to the apparatus 55 and the pins 20 are removed from the shuttle in the manner described above.

Referring to FIGS. 15 and 16, there is illustrated another embodiment of a shuttle 81 is similar to the shuttle 54 but does not include a pin-release bar. A slot 82 is formed between the sides of a back member 83 in the edge closest to a ramp 84 and extends toward an intermediate portion of the shuttle. Pins 20 are supported in the shuttle 81 in the same manner as described above with respect to shuttle 54. Moreover, pins 20 being supported by the shuttle 81 are inserted into the apparatus 55 (FIGS. 12 and 13) in the same manner as described above. To remove the pins 20 from the shuttle 81 after they are gripped within the apparatus 55, an operator of the shuttle places his fingers along the back face of the back member 83 and this thumbs along a lower portion of the ramp 84. A squeezing motion between the thumbs and fingers facilitates pivotal motion of the ramp 84 in a direction away from the tips of shank portion 24. The pivotal motion of the ramp 84 enables the tips of the shank portions 24 to return to alignment with the normal axis of the respective pins 20 and thereby permit separation of the pins from the shuttle 81. When the tips of the shank portions 24 have been released from engagement with the ramp 84, the shuttle 81 is moved in a direction away from the apparatus 55 but along the plane of the pins 20 to remove the shank portions 24 from the channels 85.

Referring to FIG. 17, there is illustrated another embodiment of a shuttle 86 which utilizes two slots 88 and 90 formed in a back member 92. Slot 88 is formed in the shuttle 86 in a manner similar to the formation of slot 82 described above. Slot 90 is formed in an intermediate portion of a back member 94 and extends from a front face toward a back face thereof. The release of the pins 20 from the shuttle 86 is performed by the squeezing motion described above with slot 90 providing additional relief in the stressing of the back member 94 during the squeezing motion.

The shuttle 81 (FIG. 15) may require a stiffner (not shown) which is added to the ramp 84. The stiffner facilitates pivotal movement of the ramp 84 away from the tips of shank portions 24 and prevents buckling of the ramp due to the stressing of the ramp during the squeezing motion.

Referring to FIG. 18, there is illustrated another embodiment of a shuttle 96. The shuttle 96 includes a wedged-shaped slot 98, formed between the sides of a back member 100 in one edge of the back member adjacent the free end of a movable ramp 102 and extends toward an intermediate portion of the shuttle. The shuttle 96 further includes two parallel, elongated spaced slots 104 (one shown) formed in the back member 100 which communicate with the slot 98. A wedge 106 having the same shape as slot 98 is positioned within the slot with one end of the wedge extending beyond the one edge of the back member 100. Pins 108 (one shown) are inserted into the wedge 106 through the slots 104. The pins 108 and the slots 104 facilitate a limited movement of the wedge 106 within the slot 98. The wedge 106 also has a knurled surface 110 formed on the one end thereof to facilitate gripping. As further illustrated in FIG. 18, one face 112 of the wedge 106 is inclined and mates with an inclined face 114 of the slot 98. Face 116 on the opposite side of wedge 106 is straight and mates with normally straight, inner face 118 of ramp 102. Outer face 120 of ramp 102 is normally flush with the base of pin-enclosing channels 122 of shuttle 96.

To use the shuttle 96, as illustrated in FIG. 19, an operator grips the wedge 108 about the knurled surface 110 and pulls the wedge in a direction away from the back member 100 but along the plane of the slot 98 until pins 108 engage surfaces 124 (one shown) of the slots 104. As the wedge 106 moves in the direction away from the back member 100, the ramp 102 is moved to position away from the wedge. The movement of the ramp 102 is due to a wedging action of the wedge 106 as it moves outward from the slot 98. Pins 20 are then inserted into the shuttle 96 and, ultimately, into the apparatus 55 (FIGS. 12 and 13) in the same manner described above.

To remove the pins 20 from the shuttle 96 after the pins have been gripped with the apparatus 55, the operator of the shuttle places his hands along the one edge of the wedge 106 and moves the wedge in a direction toward the apparatus 55. This facilitates the movement of the ramp 102 in a direction away from the tips of shank portions 24 and to a normal position as illustrated in FIG. 18. This movement of the ramp 102 enables the tips of the shank portions 24 to return to alignment with the normal axis of the respective pins 20 and thereby permit separation of the pins from the shuttle 96. After the tips of the shank portions 24 have been released from engagement with the ramp 102, the shuttle 96 is moved in a direction away from the apparatus 55 but along the plane of the pins 20 to remove the shank portions from the shuttle.

Referring to FIGS. 20 through 25, there is illustrated a pin-supporting shuttle, designated generally by the numeral 124 which is the preferred embodiment. The shuttle 124 supports the plurality of pins 20 in the spaced alignment illustrated in FIGS. 2 and 3 during a period when the strips 40 (FIG. 2) and 50 (FIG. 3) are being removed and as the pins are being assembled with a pin-insertion apparatus 126 (FIGS. 26 and 27).

Figure 20:
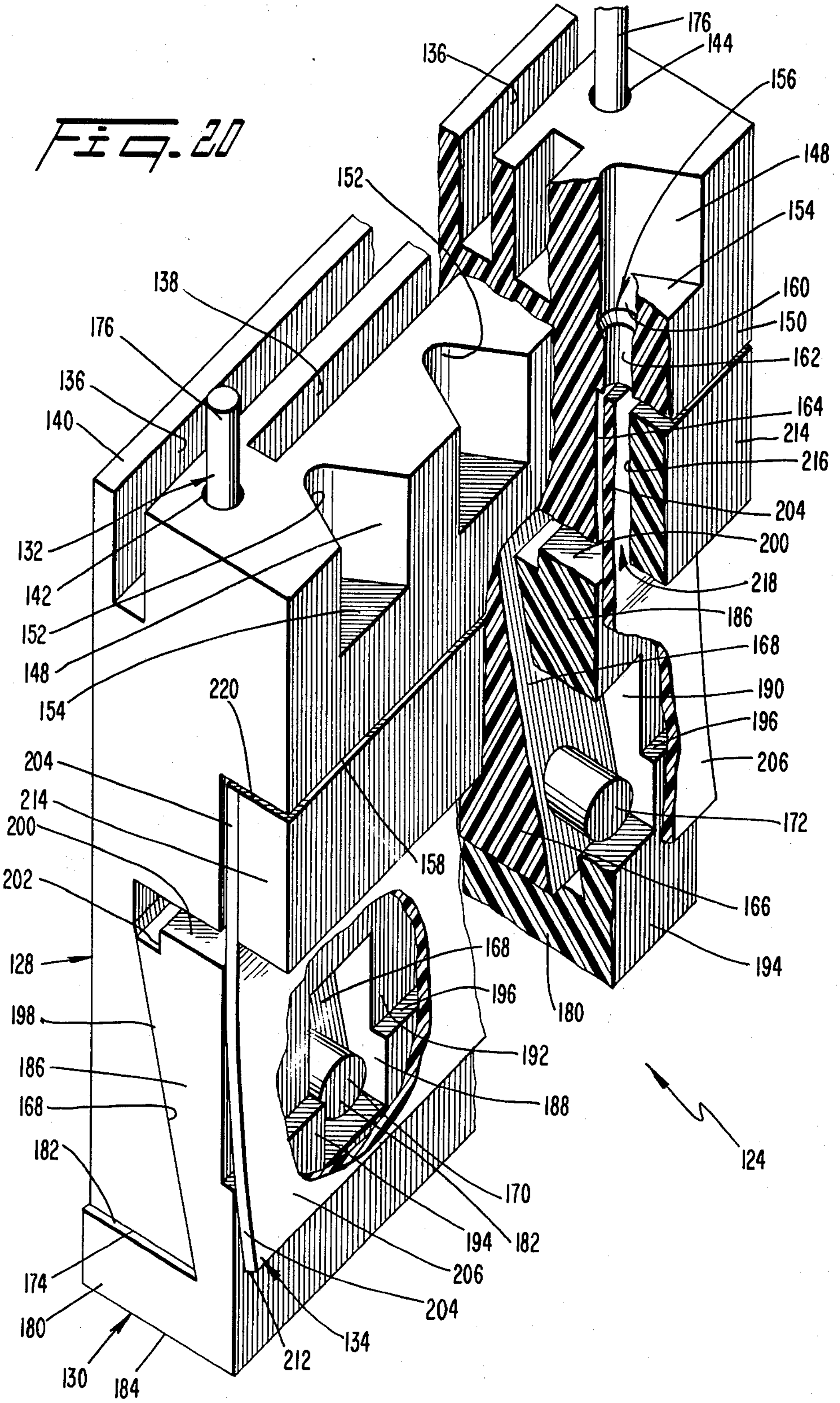
FIG. 20 is a perspective view showing still another embodiment of a pin-supporting shuttle embodying certain principles of the invention.
Figure 21:
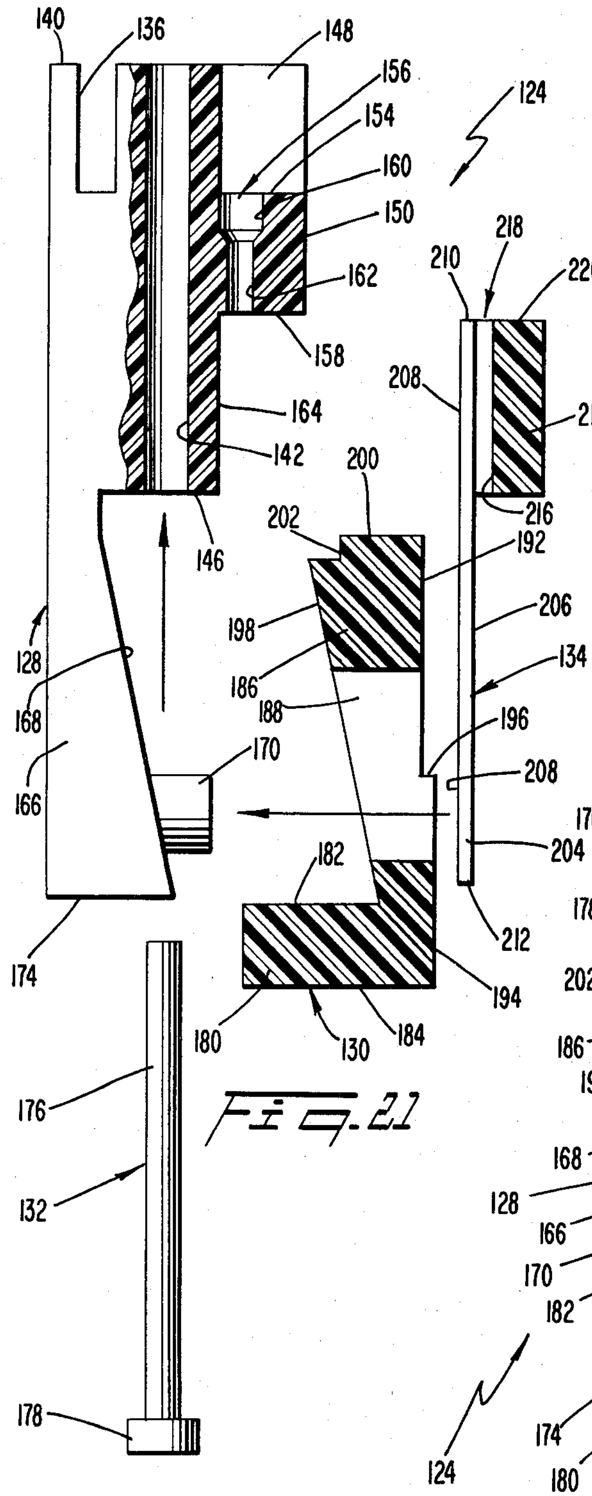
FIG. 21 is an exploded view showing the elements of the pin-supporting shuttle of FIG. 20.

Referring to FIG. 21, the shuttle 124 includes a main body, designated generally by the numeral 128 and a wedge slide, designated generally by the numeral 130. The shuttle 124 further includes a pair of pins or actuators, designated generally by the numeral 132 and a pin-wedging member, designated generally by the numeral 134. The main body 128 is formed with a pair of slots 136 and 138 in an upper face 140 thereof. Slot 136 extends from side to side of the body 128 while slot 138 is closed along the sides and at opposite ends thereof. A pair of spaced holes 142 and 144 (FIG. 20) are formed through an intermediate portion of the body 128 and extend from the upper face 140 to an intermediate underface 146. A plurality of spaced slots 148 are formed in the upper face 140 of the body 128 and extend downwardly along a side face 150 thereof. As more clearly illustrated in FIG. 20, each of the slots 148 are formed with a wide opening in the side face 150 which converges inwardly of the body 128 to a rear surface 152 of the slot. Each slot 148 is formed with a base 154 which is parallel with the upper face 140 of the body 128.

A hole, designated generally by the numeral 156, is formed in the base 154 of each slot 148 and is formed through to an undersurface 158 of the body 128. Each hole 156 is formed with an upper portion 160 and a lower portion 162. The upper portion 160 of each hole 156 is circular and larger than the cross section of the shank portion 24 of pin 20 (FIG. 1). The lower portion 162 of each hole 156 is also circular and larger than the cross section of the shank portion 24 of pin 20 but the diameter of portion 162 is smaller than the diameter of portion 160.

The body 128 is formed with a recessed side face 164 which is between and contiguous with the undersurfaces 146 and 158. Further, the body 128 is formed with a downwardly extending portion 166 having a tapered surface 168. A pair of projections 170 and 172 (FIG. 20) extend outwardly from the surface 168. In addition, the portion 166 of the body 128 is formed with an undersurface 174.

Figure 22:
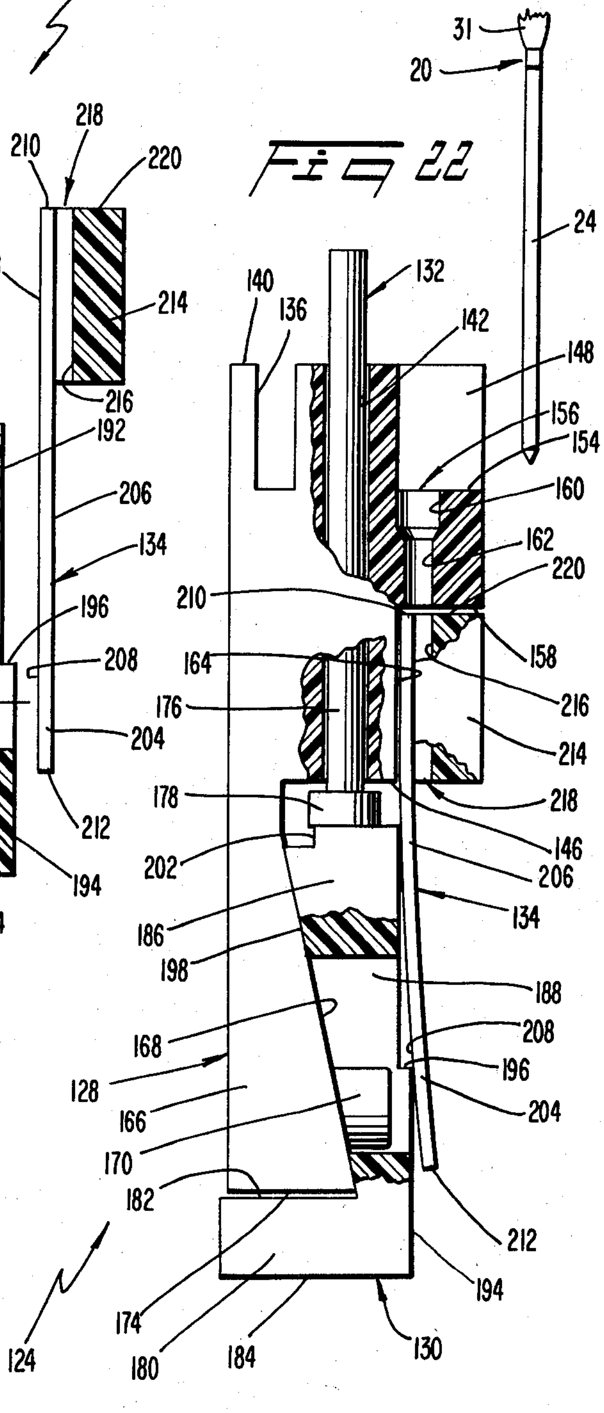

Each of the actuators 132 is formed with a shank 176 and a head 178 at one end. The actuators 132 are assembled with the body 128 by inserting the shanks 176 into the holes 142 so that the free ends of the shanks can protrude from the holes adjacent to the upper face 140 as illustrated in FIG. 20. As illustrated in FIGS. 22, 23 and 24, the head 178 of each of the actuators 132 is thereby located within a space immediately below the undersurface 146 and above the tapered surface 168 of the body 128. The diameters of holes 142 and 144 are barely larger than the diameter of shanks 176 of actuators 132 to provide for a slip fit of the shanks within the holes. Thus, once the shanks 176 have been inserted into the holes 142 and 144, the actuators 132 will be frictionally retained in the assembled position and will require an external force to reposition the shanks within the holes.

Referring to FIG. 21, the wedge slide 130 is formed with a lower ledge portion 180 having an upper surface 182 and a lower surface 184. The slide 130 is further formed with a wedge portion 186 is formed with front surfaces 192 and 194, which are offset by a shoulder 196, and with a tapered rear surface 198. The wedge portion 186 is formed with an upper surface 200. A clearance notch 202 is formed along the edge of the wedge portion contiguous to tapered surface 198 and upper surface 200.

Referring to FIG. 20, the slide 130 is assembled with the body 128 whereby the projections 170 and 172 of the body are located within the openings 188 and 190, respectively of the slide. Referring to FIG. 22, tapered surfaces 168 and 198 of body 128 and slide 130, respectively, are brought into face-to-face relationship. Also, undersurface 174 of body 128 and upper surface 182 of slide 130 are brought into face-to-face relationship. Upper surface 200 of slide 130 is located adjacent to head 178 of actuator 132 to capture the heads between the upper surface 200 and the undersurface 146 of body 128.

Referring to FIGS. 20 and 21, the pin-wedging member 134 includes a thin, flexible plate 204 having major front and rear surfaces 206 and 208, respectively, and upper and lower surfaces 210 and 212, respectively. The pin-wedging member 134 further includes a pin guide 214 formed with a plurality of spaced, parallel slots 216 corresponding in number and spacing to the number and spacing of slots 148 formed on the body 128. The pin guide 214 is secured to the upper portion of the front face 206 of plate 204 to enclose slots 216 and provide passageways 218 generally of a configuration and size comparable to the cross section of the shank portion 24 of pin 20 (FIG. 1). The pin guide 214 is formed with an upper surface 220 which is coplanar with upper surface 210 of plate 204.

The pin-wedging member 134 is assembled with body 128 by securing an upper portion of rear surface 208 of the member to side face 164 of the body and by placing upper surfaces 210 and 220 of the member into facing engagement with undersurface 158 of the body. As illustrated in FIGS. 20, 22, 23 and 24, the passageways 218 of pin-wedging member 134 are aligned with the holes 156 of body 128. As illustrated in FIGS. 20 and 22, as the pin-wedging member 134 is assembled with body 128, an intermediate portion of the rear surface 208 of the member rests against front surface 194 of slide 130 adjacent to shoulder 196.

The body 128, wedge slide 130 and pin-wedging member 134 of shuttle 124 are each composed of a suitable plastic such as polycarbonate and are molded in a conventional manner to provide strength and flexibility where needed. The actuators 132 are composed of a high-strength metal such as drill rod.

Referring to FIG. 22, when the body 128, slide 130, actuators 132 and member 134 have been assembled to form shuttle 124, the head 178 of the actuators are captured between undersurface 146 of the body and upper surface 200 of the slide. Since the pin-wedging member 134 is assembled and secured to the body 128 after the slide 130 has been assembled, the lower portion of the flexible plate 204 facilitates the capturing of the slide between the plate and the portion 166 of the body. However, since the slide 130 is not fixed secured to any other portion of the shuttle 124, the slide is movable along the tapered surface 168 of body 128 and limited in travel by relative movement of projections 170 and 172 (FIG. 20) within openings 188 and 190 (FIG. 20), respectively. Thus, as illustrated in FIG. 22, slide 130 is located in an inserted position wherein the tip end of the shank 176 of actuator 132 extends outwardly from the upper face 140 of body 128.

In use of shuttle 124, the elements of the shuttle are placed in the arrangements as illustrated in FIG. 22 whereby the shuttle is in an "unlocked" condition. One of the assemblies 44 and 52 of pins 20, as illustrated in FIGS. 2 and 3, respectively, is positioned for assembly with shuttle 124. If the assembly 44 of pins 20 is selected, the end carrier strip 42 is positioned into slot 136 of shuttle 124 and the assembly is flexed to sever the strip from the pins 20 along the scored points 48. Shank portions 24 of pins 20 now appear as free ends of assembly 44. Assembly 44 is then manipulated so that the lower free ends of shank portions 24 are spaced from but generally aligned with slots 148 of shuttle 124 as viewed in FIG. 22. Generally, the tips of shank portions 24 should be in the plane of the bases 154 of slots 148. Thereafter, assembly 44 is moved laterally toward the shuttle 124 whereby the lower free ends of the shank portions 24 move into the adjacent slots 148 and seat at the rear surfaces 152 thereof. The wide openings of slots 148, as illustrated in FIG. 20, permit an operator to generally align the shank portions 24 with the slots prior to assembly, rather than having to precisely align the shank portions with the rear surfaces 152. The converging side walls of the slots 148 assist the operator in precisely locating the lower ends of the shank portions 24 at the rear surfaces 152 of the slots by laterally guiding the shank portions as they are moved toward the rear surfaces.

Referring to FIG. 23, after the lower ends of the shank portions 24 have been seated in the rear surfaces 152 of slots 148, the assembly 44 is moved to insert the lower ends of the shank portions through the holes 156 and passageways 218. As the tip ends of the shank portion 24 pass through the circular portions 160 and 162 of holes 156, the tip ends are guided into a narrowing throughway formed by the portions in preparation for entering the shank-cross-section conforming passageways 218. The tip ends of the shank portions 24 are eventually moved through the passageways 218 and into engagement with the extended portions of front surface 206 of plate 204 whereby the shank portions are moved slightly laterally of the axis of the pins 20. Eventually, undersurfaces 34 and 36 of lateral ears 26 and 28 (FIG. 2) of the pins 20 come to rest on the upper surface 140 of shuttle 124 adjacent to the slots 148 and the pins are now fully assembled with the shuttle.

Thereafter, as illustrated in FIG. 24, slide 130 is moved to a fully withdrawn position. This is accomplished by pushing the tip ends of actuator shanks 176 into the holes 142 and 144 whereby actuator heads 178 press against upper surface 200 of slide 130 to move the slide forward the withdrawn position. Also, as slide 130 moves to the withdrawn position, projections 170 and 172 (FIG. 20) move relatively within openings 188 and 190 (FIG. 20), respectively, to the position illustrated in FIG. 24, as limited by the size of the openings. When slide 130 reaches the withdrawn position of FIG. 24, the flexible plate 204 snaps into a position whereby the lower surface 212 of the plate rests on shoulder 196 of the slide. Since projections 170 and 172 are now in the uppermost position within openings 188 and 190 respectively, slide 130 can not be moved downwardly any further. Also, since lower surface 212 of plate 204 is resting on shoulder 196 of slide 130, the slide can not be moved upwardly any further. Therefore, the elements of shuttle 124 are now "locked" in the position illustrated in FIG. 24. As the slide 130 is moved to the withdrawn position, plate 204 is flexed outwardly toward shank portions 24 to acutely and laterally deflect the shank portions and firmly wedge the pins 20 with the shuttle 124. The shuttle 124 can now be manipulated without concern for the pins 20 separating therefrom. Thereafter, strip 40 (FIG. 2) can be removed along scored points 46 whereby the pins 20 are now held individually by the shuttle 124 in a desired spacing and alignment.

Figures 25, 26, 27:
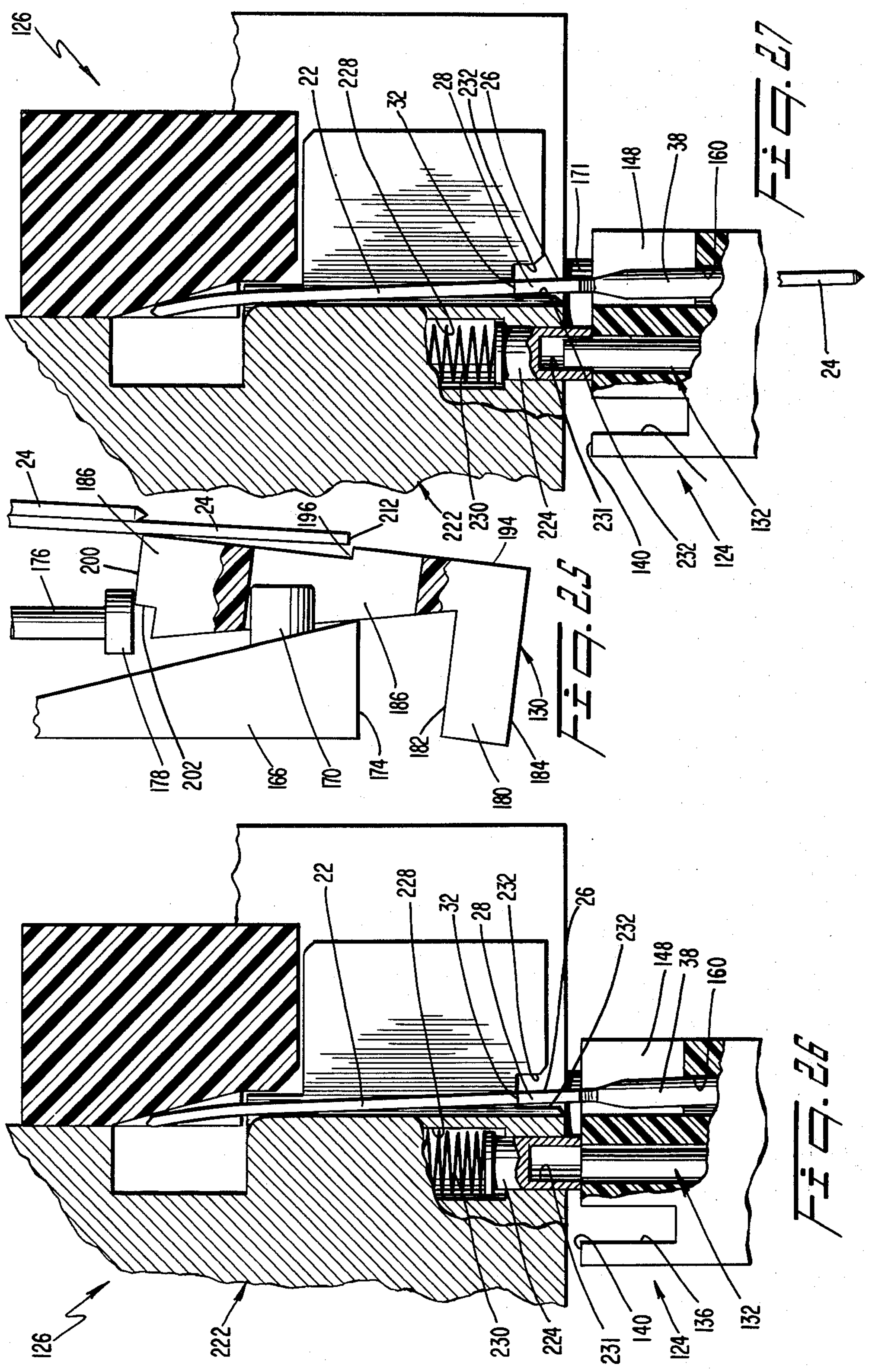

In order to release the pins 20 from the shuttle 124, the slide 130 is rocked as illustrated in FIG. 25. As the slide 130 is rocked, the upper corner of front surface 192 of the slide engages the rear surface 208 of plate 204 and urges the plate outwardly away from the slide. This action results in the lower surface 212 of plate 204 moveing away from the shoulder 196 of slide 130 whereby relative movement between the slide and the body 128 can occur. Thereafter, the slide 130 and body 128 are moved relatively so that the slide and body assume the position illustrated in FIG. 23. In this position, plate 204 is now relaxed or flexed inwardly toward slide 130. The lower ends of shank portions 24 are still in engagement with the front surface 206 of plate 204. However, the wedging action of the shank portions 24 with plate 204, as illustrated in FIG. 23, has been relaxed considerably and to the extent that pins 20 may be removed from the shuttle 124 with minimum effort.

Assembly 52 (FIG. 3) of pins 20 is assembled with shuttle 124 in a manner identical to that described above with respect to assembly 44 (FIG. 2). After the pins 20 of assembly 52 have been assembled with shuttle 124, the body-carrier strips 50 (FIG. 3) are removed whereby the pins are retained individually by the shuttle in the same spaced alignment of the assembly.

Referring to FIG. 26, in one use of shuttle 124, the pins 20 assembled with the shuttle are to be assembled with a pin insertion head 222 of the pin-insertion apparatus 126. As shuttle 124 is moved upwardly by an operator to assemble the pins 20 with insertion head 222, upper face 140 of the shuttle engages and urges a pair of pins 224 upwardly into holes 228 in the head against the biasing action of springs 230. Further actuators 132 of shuttle 124 are aligned with openings 230 of respective pins 224.

When the shoulder surfaces 30 and 32 (FIG. 2) of pins 20 engage the upper surface of slots 232, the shuttle 124 has reached the uppermost position which is sensed by the operator. The operator then relaxes the application of the upward force on the shuttle 124. At this time, the biasing forces of compressed springs 230 are released to cause pins 224 to press downwardly on shuttle 124 whereby the shuttle is moved quickly a short distance away from the insertion head 222 as illustrated in FIG. 27. This rapid movement of shuttle 124 removes the tip ends of shank portions 24 of pins 20 from frictional engagement with the shuttle whereby the pins 20 are now fully supported and held by the insertion head 222. The shuttle 124 is completely removed from the area of the insertion head 222 to reveal the shank portions 24 of pins 20 extending downwardly from the insertion head.

it is noted that, as illustrated in FIG. 20, the main body 128 and the pin wedging member 134 of shuttle 124 are joined to form an assembly which has at one end, the upper face 140 and, at the opposite end, lower surface 184. The holes 156 and passageways 218 combine to form pin-enclosing channels with the inward face of each of the passageways forming a base surface planar with the base surfaces of the remaining passageways. Further, the opening defined by the tapered surface 168 of main body 128 and the opposed rear surface 208 of plate 204 forms a wedge-shaped slot which receives wedge slide 130 therein. Flexible plate 204 functions as a movable ramp with the front surface 206 thereof being a continuation of the planar base surfaces of the channels formed by the holes 156 and passageways 218. The front surface 206 of plate 204 is normally flared slightly into the plane of the planar base surfaces. Thus, as pins 20 are assembled with shuttle 124, as illustrated in FIG. 23, the tip ends of shank portions 24 engage the normally flared portion of plate 204 and are slightly wedged with the shuttle. When wedge slide 130 is moved downwardly, as illustrated in FIG. 24, plate 204 is flared further outwardly to firmly wedge the pins 20 with the shuttle.

What is claimed is:

1. A pin supporting shuttle for supporting pins in a predetermined uniform spacing where each pin has a shank portion with a tip, which comprises:

means for enclosing an intermediate section of each of the pins while maintaining the uniform spacing therebetween;

means for locating the tip of each of the shank portions laterally of the normal axis of the pin to wedge the shank portion between the enclosing means and the locating means; and means for returning the tip of each of the pins to alignment with the normal axis of the pin to permit separation of the pins from the shuttle.

2. The pin supporting shuttle as set forth in claim 1, wherein the returning means comprises means for moving the tip of each of the pins away from the locating means to return the tip to alignment with the normal axis of the pin and thereby permit separation of the pins from the shuttle.

3. The pin supporting shuttle as set forth in claim 1, wherein the returning means comprises means for moving the locating means away from the tip of each of the pins so that each of the tips returns to alignment with the normal axis of the pin and thereby permit separation of the pins from the shuttle.

4. The pin supporting shuttle as set forth in claim 1, wherein the enclosing means comprises:

a back member formed with a plurality of parallel channels arranged in the uniform spacing in one face thereof;

a front member; and means for securing the front member to the back member to enclose the parallel channels.

5. The pin supporting shuttle as set forth in claim 2, wherein the moving means comprises:

a bar which is mounted for sliding movement on the locating means; and means for securing for limited movement the bar to the locating means.

6. The pin supporting shuttle as set forth in claim 3, wherein the locating means comprises:

a member having a front face;

a ramp which is integrally formed with the member on the front face adjacent to one edge thereof and which engages the tip of each pin to wedge the shank portion between the enclosing means and the ramp; and wherein the moving means comprises:

a slot formed behind the ramp and in the one edge adjacent to the ramp between side edges of the member which facilitates pivotal movement of the ramp in a direction away from the normal axis of the pins.

7. The pin supporting shuttle as set forth in claim 4, wherein each enclosed channel includes a pin-entry end and which further comprises rounded portions formed in the one face of the back member adjacent to the pin-entry end of each of the plurality of parallel channels.

8. The pin supporting shuttle as set forth in claim 7 which further comprises a plurality of slots formed along and through one edge of the front member which are aligned with the rounded portions formed in the back member.

9. The pin supporting shuttle as set forth in claim 4, wherein each enclosed channel includes a pin-exit end and wherein the locating means comprises a ramp which is integrally formed with the back member in the one face thereof and extends from a position beyond the pin-exit end of the plurality of channels toward an edge of the back member.

10. The pin supporting shuttle as set forth in claim 9, which further comprises an intermediate surface formed on the one face of the back member between the pin-exit end of each of the parallel channels and the ramp.

11. The pin supporting shuttle as set forth in claim 9, wherein the returning means comprises:

a bar which is mounted for sliding movement on the ramp; and means for securing for limited movement the bar to the ramp.

12. The pin-supporting shuttle as set forth in claim 1, wherein the enclosing means comprises:

a member formed in one face and adjacent one edge thereof with a plurality of enclosed parallel channels arranged in the uniform spacing with each channel having a base surface planar with the base surfaces of the remaining channels; and wherein the locating means comprises:

a wedge-shaped slot having opposed surfaces formed in an edge of the member opposite the one edge;

a movable ramp integrally formed at one end with the member adjacent to the channels and being free at the opposite end;

the movable ramp having an inner surface which defines one opposed surface of the wedge-shaped slot and an outer surface which is normally planar with the base surfaces of the channels;

a wedge positioned within the slot and movable to urge the ramp outwardly from the slot and into the plane of the planar base surfaces so that tips of pins being moved through the enclosed channels engage the moved ramp whereby the pins are wedged with and supported by the shuttle.

13. The pin supporting shuttle as set forth in claim 12 wherein the wedge is movable within the wedge-shaped slot to a first position to move the ramp into the plane of the planar base surfaces of the member, and wherein the returning means comprises the wedge being movable to a second position within the wedge-shaped slot to permit the ramp to return to the position whereat the outer surface of the ramp is planar with the base surfaces of the channel.

14. The pin-supporting shuttle as set forth in claim 13 which further comprises means for securing the wedge within the wedge-shaped slot for limited movement between the first and second positions.

15. A pin-supportin shuttle for supporting pins in a predetermined uniform spacing where each pin has a shank portion with a tip, which comprises:

means for enclosing an intermediate section of each of the pins while maintaining the uniform spacing therebetween;

means for moving the tip of each of the shank portions from an initial alignment and laterally of the normal axis of the pin to wedge the shank portion between the enclsoing means and the locating means; and means for withdrawing the moving means to return the tip of each of the pins to the initial alignment and thereby permit separation of the pins from the shuttle.

16. The pin-supporting shuttle as set forth in claim 15, wherein the enclosing means comprises:

an assembly formed with a plurality of enclosed parallel channels in one end thereof and arranged in the uniform spacing with each channel having a base surface planar with the base surfaces of the remaining channels; and wherein the moving means comprises:

a movable ramp integrally formed at one end with the assembly adjacent to the channels and being free at the opposite end;

a wedge-shaped slot having opposed surfaces formed in an end of the assembly opposite the one end;

the movable ramp having an inner surface which defines one opposed surface of the wedge-shaped slot and an outer surface which is a continuation of the base surfaces of the channels and flares normally into the plane of the base surfaces whereby the pins are slightly wedged when assembled with the shuttle; and a wedge positioned within the slot and movable to flare the ramp further outwardly from the slot and further into the plane of the planar base surfaces so that tips of assembled pins are thereby firmly wedged with the shuttle when the ramp is moved outwardly.

17. The pin-supporting shuttle as set forth in claim 16 wherein the wedge is movable within the wedge-shaped slot to a first position to move the ramp further into the plane of the planar base surfaces of the assembly, and wherein the withdrawing means comprises the wedge being movable to a second position within the wedge-shaped slot to permit the ramp to return to the normally flared position.

18. The pin-supporting shuttle as set forth in claim 17 which further comprises means for securing the wedge within the wedge-shaped slot for limited movement between the first and second positions.

19. The pin-supporting shuttle as set forth in claim 16 which further comprises means for locking the shuttle in position when the pins have been firmly wedged therewith.

20. The pin-supporting shuttle as set forth in claim 19 which further comprises means for unlocking the locked shuttle.

21. The pin-supporting shuttle as set forth in claim 19 wherein the locking means includes:

an enclosed opening formed in the wedge;

a projection extending outwardly from the assembly and into the enclosed opening of the wedge to limit movement of the wedge outwardly of the wedge-shaped slot;

a shoulder formed on the wedge adjacent to the movable ramp; and a surface on the movable ramp engagable with the shoulder of the wedge to prevent movement of the wedge into the wedge-shaped slot whereby the wedge is precluded from any movement into or out of the slot.

22. The pin-supporting shuttle as set forth in claim 21 wherein the locking means further comprises an actuator having portions which extend outwardly from the assembly and portions inwardly of the assembly in engagement with the wedge, the actuator being movable through the assembly to move the wedge outwardly of the slot until the wedge is in the locked position.

23. A pin supporting shuttle for supporting pins in a predetermined uniform spacing where each pin has a shank portion with a tip, which comprises:

a front member formed with a plurality of slots through and along one edge thereof and arranged in the uniform spacing;

a back member formed with a plurality of parallel channels in one face thereof and arranged in the uniform spacing;

enlarged rounded portions formed in the one face of the back member between a pin-entry end of the channels and an adjacent edge of the back member and arranged in the uniform spacing;

means for securing the front member to the back member to facilitate the enclosure of the parallel channels and to align the slots of the front member with the rounded portions of the back member;

a ramp integrally formed in the one face of the back member and having an incline which extends into the plane of the channels from a pin-exit end of the channels to an edge of the back member opposite the one edge thereof;

a pin release bar; and means for securing for limited movement the pin release bar on the ramp.

24. A method of inserting pins, where each pin has a shank portion with a tip, into an apparatus, which comprises the steps of:

enclosing an intermediate section of the shank portion of each of the pins within a pin supporting shuttle;

locating the tip of each of the shank portions laterally of the normal axis of the pin to wedge the shank portion within the pin supporting shuttle;

moving the shuttle to insert opposite ends of the pins into gripping portions of the apparatus; and returning the tip of each of the pins to alignment with the normal axis of the pin to permit separation of the pins from the shuttle.

25. The method as set forth in claim 24, wherein the step of locating comprises moving the tip of each pin to engage a surface of a ramp of the shuttle which facilitates the movement of the tip of each of the shank portions laterally of the normal axis of the pin to wedge the shank portion within the shuttle.

26. The method as set forth in claim 25, wherein the step of returning comprises the step of moving the tip of each of the pins away from the ramp to return the tip to alignment with the normal axis of the pin to permit separation of the pins from the shuttle.

27. The method as set forth in claim 25, wherein the step of returning comprises the step of moving the ramp laterally away from the tip of each of the pins so that the resiliency of the pins permits each of the tips to return to alignment with the normal axis of the pin and thereby permit separation of the pins from the shuttle.

28. The method as set forth in claim 26, wherein the step of moving the tip of each of the pins comprises the step of exerting a force on the tips of each of the pins with a pin release bar of the shuttle in a direction of the apparatus while simultaneously moving the remaining portions of the shuttle in a direction away from the apparatus to separate the pins from the shuttle.

29. The method as set forth in claim 27, wherein the step of moving the ramp comprises the step of squeezing the ramp and a back member of the shuttle together to move the ramp laterally away from the tip of each of the pins so that the resiliency of the pin permits each of the pins to return to alignment with the normal axis of the pin and thereby permit the shuttle to be moved in a direction away from the apparatus to separate the pins from the shuttle.

* * * * *